US006149389A

United States Patent [19]

Hennies et al.

[11] Patent Number: 6,149,389

[45] Date of Patent: Nov. 21, 2000

[54] PROTECTIVE COATING FOR TURBINE BLADES

[75] Inventors: Hans-Henning Hennies, Karlsruhe; Günther Kessler, Stutensee; Gerd Krafft, Karlsruhe; Georg Müller, Karlsruhe; Gustav Schumacher, Karlsruhe, all of Germany

[73] Assignee: Forschungszentrum Karlsruhe GmbH, Karlsruhe, Germany

[21] Appl. No.: 09/151,853

[22] Filed: Sep. 11, 1998

Related U.S. Application Data

[63] Continuation-in-part of application No. PCT/EP97/00630, Feb. 12, 1997.

[30] Foreign Application Priority Data

Mar. 13, 1996 [DE] Germany ........................... 196 09 690

[51] Int. Cl.$^{7}$ .............................. F01D 5/28; B32B 15/00

[52] U.S. Cl. ................................ 416/241 R; 416/241 B; 428/668; 428/679; 428/678; 428/680

[58] Field of Search ........................ 415/200; 416/241 R, 416/241 B; 428/680, 678, 679, 668

[56] References Cited

U.S. PATENT DOCUMENTS

| | | | |
|---|---|---|---|
| 4,451,299 | 5/1984 | Smeggil et al. | 427/380 |
| 4,668,527 | 5/1987 | Fujita et al. . | |
| 5,547,769 | 8/1996 | Schmitz | 416/241 R |

FOREIGN PATENT DOCUMENTS

| | | |
|---|---|---|
| 0 168 868 | 1/1986 | European Pat. Off. . |
| 0 190 378 | 8/1986 | European Pat. Off. . |
| 33 10 650 | 3/1984 | Germany . |
| 33 25 251 | 1/1985 | Germany . |
| 3905347 | 8/1990 | Germany . |
| 60-257875 | 12/1985 | Japan . |

OTHER PUBLICATIONS

E. Bedogni et al., "Laser and Electron Beam in Surface Hardening of Turbine Blades", *Laser Advanced Materials Processing*, May 1987, pp. 567–572.

*Primary Examiner*—Edward K. Look
*Assistant Examiner*—Richard Woo
*Attorney, Agent, or Firm*—Klaus J. Bach

[57] ABSTRACT

On a turbine blade a protective corrosion resistant surface layer consisting of a MCrAlY alloy is generated by melting the surface of the turbine blade with the MCrAlY alloy uniformly distributed over the surface of the turbine blade by a pulsed electron beam to a depth of 5–50 μm whereby a smooth surface is generated.

3 Claims, 1 Drawing Sheet

PROTECTIVE COATING FOR TURBINE BLADES

This is a Continuation-in-Part application of International patent application PCT/EP97/00630 filed Feb. 12, 1997 and claiming the priority of German patent application 196 09 690.1 filed Mar. 13, 1996.

BACKGROUND OF THE INVENTION

The invention relates to a turbine blade with a corrosion resistant protective coating of MCrAlY.

During the operation of high temperature gas turbines, the turbine blade surfaces reach temperatures of up to 900° C. At such high temperatures, the principal corrosion mechanism resides in oxidation (diffusion of oxygen). The blades are therefore coated by a high temperature super alloy MCrAlY(M=metal basis, for example Ni, Co).

Protective MCrAlY coatings are generally applied by a plasma spray coating process. The alloy solidifies in a two phase form. This provides for a good basis for the formation of $AL_2O_3$ cover layers on the surface. On the surface of the two-phase alloy, the formation of a homogeneous oxide layer is inhibited. The oxide cover layers, which are formed on the surface, are subject to spalling.

R. Sivakumor, Princ. of Scientific and Mat. Process, Vol. 2, Page. 671–726 discloses that this two phase layer can be converted to a single phase layer in a melt conversion process using laser beams. The disadvantage of this method is that the laser beam covers only a small area (at the power densities required herefor, which is $10^5$–$10^6$ W/cm$^2$) of <$10^{-2}$ cm$^2$ and the low penetration depth of the laser beam into the material.

The small area energy input results in excessive thermal tensions which lead to the formation of cracks in longitudinal as well as transverse directions. Cracks reduce the spallation resistance of the oxidation layers and, consequently, of the corrosion resistance.

Also, the small laser beam diameter results in the formation of beads on the surface, in phase separations, and recrystallizations because of the raster movement of the laser beam on the surface.

The relatively long irradiation time of several milliseconds for the melting of a layer of 10 $\mu$m thickness results in a change of the original stoichiometry in the layer, that is it leads to a reduction of the content of the light elements (Al,Y) which, by convection, are floated to the surface and consequently, are not available for the renewal of the oxidation layer.

It is the object of the present application to provide a turbine blade with a coating which is not subject to spalling.

SUMMARY OF THE INVENTION

On a turbine blade a protective corrosion resistant surface layer consisting of a MCrAlY alloy is formed by uniformly distributing the MCrAlY alloy over the surface of the turbine blade and melting the surface of the turbine blade by a pulsed electron beam to a depth of 5–50 $\mu$m whereby a smooth surface is generated.

An embodiment of the invention will be described below in greater detail on the basis of the accompanying drawings:

DESCRIPTION OF A PREFERRED EMBODIMENT OF THE INVENTION

Figure 1A:
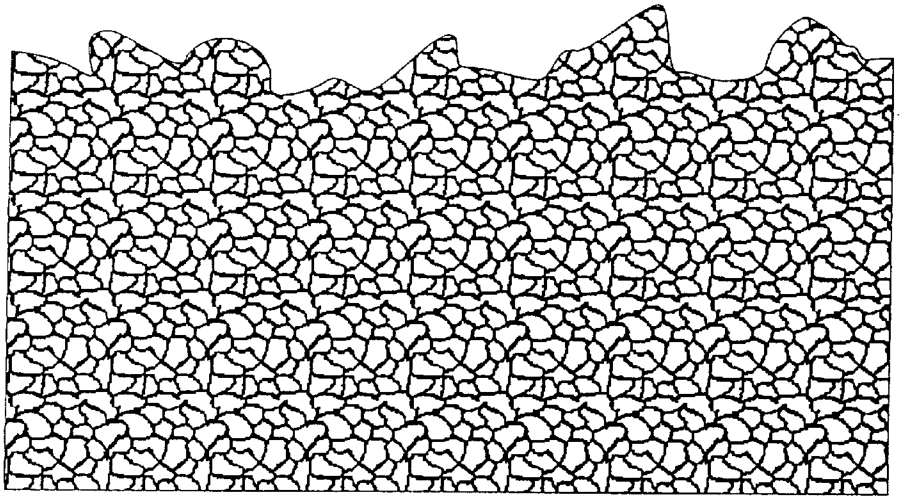
Fig. 1a Prior Art
FIG. 1*a* shows a cross-section of a conventional two-phase MCrAlY turbine blade coating before the remelt procedure.
Figure 1B:
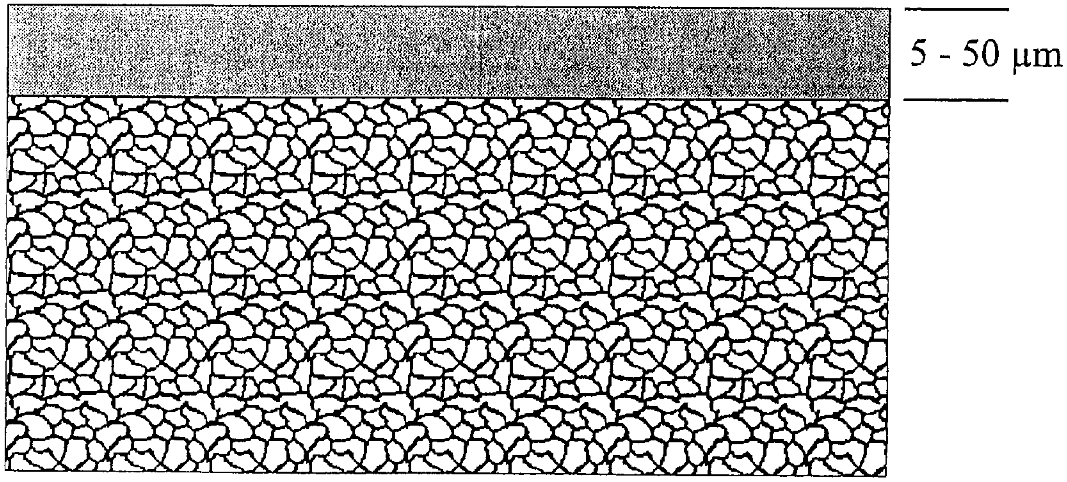
FIG. 1*b* shows the same coating after the remelt procedure.

If the protective coating is shortly remelted and again rapidly cooled, that is so rapidly cooled, that there is no time for phase separations, a single phase structure is obtained which, depending on the cool-down speed, is monocrystalline or even amorphous and which results in the formation of a uniform uninterrupted oxide cover layer. Corrosion tests of a duration of up to 10,000 hrs at 1000° C. on air have shown that the surface of protective coatings of a MCrAlY cover layer up to a depth of 5–50 $\mu$m consists uniformly of a single phase alloy which was formed by remelting with a pulsed electron beam and which forms a firmly attached uninterrupted oxide cover layer. In samples in which the surfaces were not subjected to remelting, the surface structure is interrupted and shows some spalling. Although such defects in the oxide surface are healed by the immigration of aluminum, the process results in a depletion of the aluminum in the protective MCrAlY layer and consequently, in a reduction of the service life.

Another advantage of the protective turbine blade layer according to the invention is that the micro-roughness of the surface provided by the surface protection is eliminated so go that the heat transfer from the gas to the surface is reduced and consequently a higher gas inlet temperature can be utilized. Higher gas inlet temperatures increase the efficiency of the turbine. With a homogeneous single phase alloy, the conditions for forming a uniform oxide cover layer are favorable. A uniform spalling-resistant oxide cover layer most effectively prevents oxygen from entering which slows down the Al depletion of the protective layer by forming new oxide cover layers.

For providing the corrosion protective layers, a pulsed electron beam with a large beam cross-section is used. The beam cross-sections are between 50 and 100 cm$^2$. Optimal cross-sections should be 25 to 100 cm$^2$. The advantage offered by an electron beam are the large beam diameter and the large penetration depth of the electrons into the material which can be easily controlled by way of the energy of the electrons. With pulsed electron beams, high power densities of up to $3\times10^6$ W/cm$^2$ can be generated uniformly on a surface of 50 cm$^2$. Such power densities are greater than those of a laser beam by an order of 4. With the uniform power distribution, there are no temperature gradients in the melted surface layer parallel to the surface so that transverse tension cracks do not occur. The formation of a so-called heat affected zone at the edge of the beam remains without consequences because of the very short processing time and the high cooling rate.

The depth of the melted layer is adjusted by way of the energy input, the pulse duration and the power density of the electron beam.

An important reason for the elimination of tension cracks normal to the surface and the conversion of the two-phase alloy to the single-phase amorphous to monocrystalline structure is the cool-down rate during the process of self-quenching.

If the cool-down rate is relatively small, that is <$10^7$K/s, thermal tension cracks occur.

The cool-down rates during self quenching can be influenced by the electron energy (it is utilized for controlling the melting depth) and by the power density and the pulse duration. Increasing the penetration depth of the electrons (melting depth) and reducing the power density result in smaller cooldown rates.

The electron beam parameter for generating the protective layers in accordance with the invention can be summarized as follows:

electron energy 50–150 KeV power density $5\times10^{5}$–$3\times10^{6}$ W/cm$^{2}$ pulse duration 10–60 $\mu$sec.

From J. G. Smeggil, Mat. Sci. And Eng., 87 (1987) Page. 251/60, it is known that, by an addition to the alloy of at least one of the components including strong oxide formers such as La, Al, Ce, the chances for spalling and for cracks can be greatly reduced and also the crack formation and high temperature stability of the surface layer structure are positively affected.

This addition to the alloy is applied together with the MCrAlY powder by a plasma spray procedure. Specifically, the high temperature metals (Ta, Re, Mo, W) are not sufficiently melted in this step because of their high melting points so that they recondense generally in their original powder form. As a result, undissolved islands of high temperature metals are formed which, in this form, are effective only locally. With the remelting procedure according to the invention, these metals are dissolved together with the protective MCrAlY layer. Only in this way can their stabilizing effects be activated for the whole alloyed layer area.

The stabilizing effect of the added elements is needed only in the area of the surface layers which are exposed to corrosion. Therefore, a thin additional layer including one or more components consisting of oxide formers such as La, Al, Ce and high temperature metals with a melting point greater than 2500° C. may be deposited on the protective MCrAlY and melted together therewith whereby they are all alloyed together. This has the economical advantage that the additional elements are added on the surface and only a relatively small amount of these expensive elements is needed.

What is claimed is:

1. A turbine blade having a protective corrosion resistant surface layer consisting of a MCrAlY alloy wherein M is a base metal, said protective layer having a depth of 5–50 $\mu$m and being uniformly distributed over the surface of said turbine blade as a single phase alloy generated by being melted in place by a pulsed electron beam, said protective layer, after being melted by said pulsed electron beam, being rapidly cooled such that there is no time for phase separations, whereby a single-phase monocrystalline surface layer is provided.

2. A turbine blade according to claim 1, wherein said protective corrosion resistant MCrAlY layer comprises at least one compound including a strong oxide former such as La, Al, Ce and high temperature metals with a melting point higher than 2500° C. which are uniformly distributed throughout the whole protective MCrAlY surface layer.

3. A turbine blade according to claim 2, wherein said strong oxide forming layer is deposited on said protective MCrAlY layer before the surface is melted by said pulsed electron beam so that it is melted together with said protective MCrAlY layer.

* * * * *